(No Model.)
W. GUTENKUNST.
SHREDDING DEVICE FOR CORN HUSKERS AND FEED CUTTERS.
No. 564,747. Patented July 28, 1896.
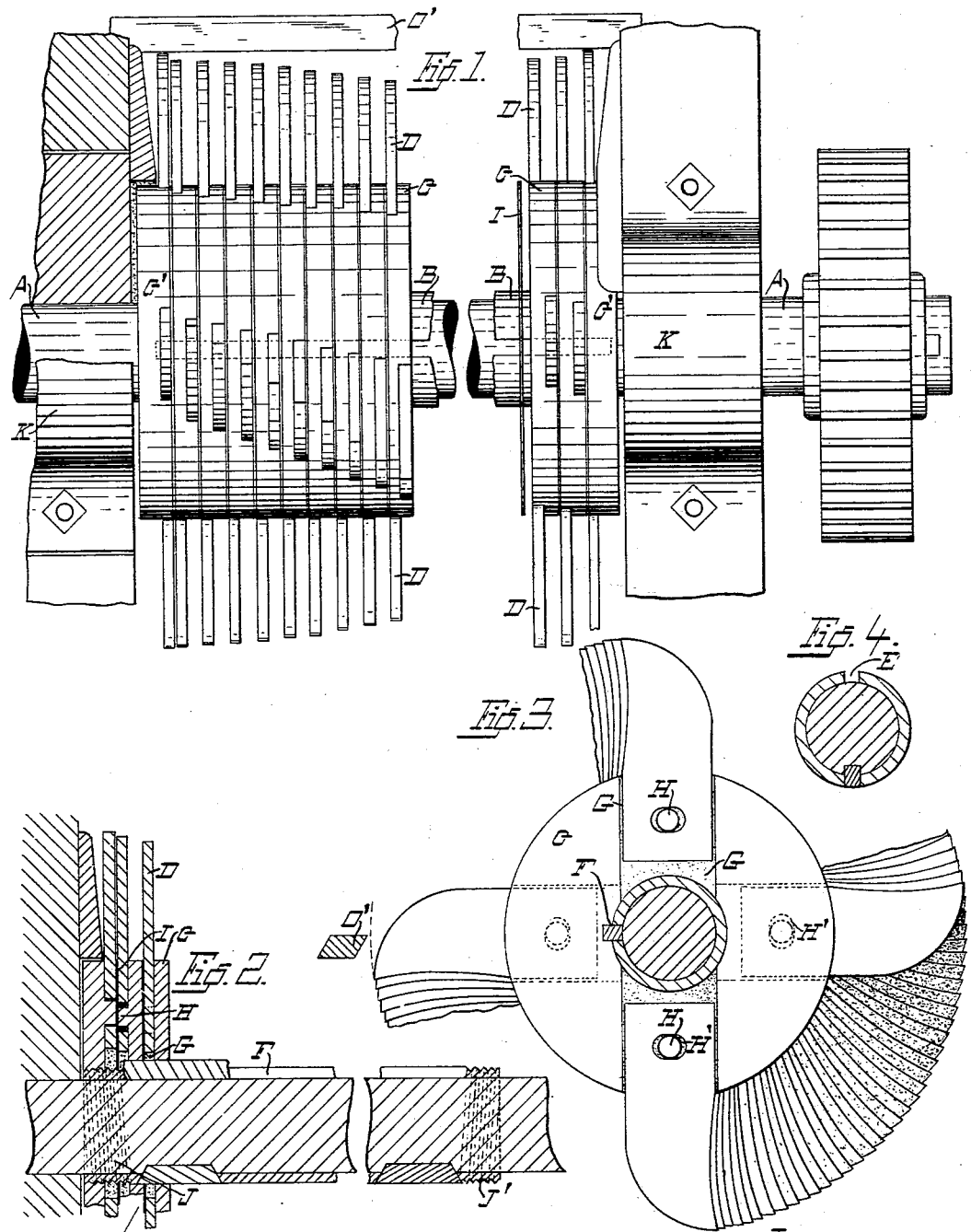
Witnesses:
Ferd A. Otto
C. L. Roesch
Inventor
William Gutenkunst
By Erwin Wheeler & Wheeler
Attorneys.

UNITED STATES PATENT OFFICE.

WILLIAM GUTENKUNST, OF MILWAUKEE, WISCONSIN.

SHREDDING DEVICE FOR CORN-HUSKERS AND FEED-CUTTERS.

SPECIFICATION forming part of Letters Patent No. 564,747, dated July 28, 1896.

Application filed November 2, 1895. Serial No. 567,700. (No model.)

*To all whom it may concern:*

Be it known that I, WILLIAM GUTENKUNST, a citizen of the United States, residing at Milwaukee, in the county of Milwaukee and State of Wisconsin, have invented new and useful Improvements in Shredding Devices for Corn-Huskers and Feed-Cutters, of which the following is a specification.

My invention pertains to improvements in shredding devices for corn-husking machines.

My object is to provide an improved shredding device which can be quickly and easily put together and taken apart for repairs or for substituting new teeth and the parts of which will be bound together by the resistance against the shredding-teeth.

I intend to use my invention as a substitute for the cutter O shown in Figure 3 of my former patent, No. 440,826, issued from the United States Patent Office on the 18th day of November, 1890, for a combined feed-cutter and corn-husker, but it is obvious that my present invention can be readily applied to any other form of corn-husking or feed-cutting apparatus.

In the following description reference is had to the accompanying drawings, in which my invention is shown separately from the husker, the mode of attachment and operation being obvious.

In the drawings, Fig. 1 is a top view of my invention with the center of the shredder broken away. Fig. 2 is a partial sectional view, drawn on the axis of the supporting-shaft. Fig. 3 is a partial side view of the shredding device, showing the cutting-teeth. Fig. 4 is a cross-section view of the shaft and key tube or sleeve, drawn through the key which secures the tube on the shaft.

Like parts are identified by the same reference-letters throughout the several views.

The supporting-shaft A is provided with a tube or sleeve B, keyed to the shaft near each end, as shown in Figs. 2 and 4. Circular plates C C, provided with detachable shredding-teeth D, are disposed in serial order upon the shaft-tube, each plate C being adjusted with its teeth slightly in advance of the teeth of its adjacent left-hand plate, thus causing the teeth of the series of plates to be arranged spirally with respect to the longitudinal axis of the shaft. The plates are keyed to the tube in the longitudinal slot E, the key-notches F in the plates being so disposed as to fix the relative position of each plate.

Each of the plates C is preferably provided with four shredding-teeth, and the several plates are so adjusted, by means of the relative arrangement of the key-notches F with respect to the shredding-teeth, that the extreme right-hand plate occupies a position about one-quarter of a turn in advance of the extreme left-hand plate, the adjustment of the intermediate plates being graduated accordingly, the teeth being thereby caused to act in succession and the action of the shredding-wheel rendered constant.

The shredding-teeth are preferably formed of sheet-steel, cut into the required shape, and the inner ends of the teeth are located in recesses G in the plates C of a depth equal to the thickness of the teeth. A lug H is located near the center of each recess, projecting, as shown, from its inner face, and fits loosely into a hole H' in the tooth, thus preventing the tooth from sliding out of the recess, and the adjoining plate holds the tooth in the recess laterally.

It will be observed that the diametrically oppositely-disposed teeth are in each case located upon the same side of their supporting-plate C, and that the pairs at right angles to each other are located upon the opposite sides of the plate. As the plates are slightly thicker than two of the teeth, taken together, it is evident that the plane of rotation of the teeth on opposite sides of the plate are slightly separated, thus permitting the shredded fodder to escape between them. A thin disk I of metal or cardboard similarly separates the planes of the teeth of adjacent plates.

The screw-threaded clamping-plates C' are provided with teeth on the inner side only, and are screwed upon the ends of the tube or sleeve B, the screws J and J' being right and left hand, respectively, and so arranged that the resistance to the teeth will tend to rotate the plates C' inward upon the tube, thus binding all the plates more rigidly together.

The shredder receives the stalks from over the transverse shear-plate O', and the ends of the teeth being rounded off rearwardly it will be seen that there is no danger of the stalks binding between the teeth and the shear-plate, as the points of the teeth approach nearest to the shear-plate at its upper edge and recede therefrom as the plates are rotated.

It will be observed that this construction permits the shredder to be taken apart at pleasure by simply removing it from the bearings K K and unscrewing one of the end plates C'. When this is done, all of the plates may be quickly removed, and the teeth are freed from the recesses by the removal of the adjacent plates. The use of the tube avoids the necessity of grooving the shaft, whereby the same would be weakened, and also facilitates screwing in the end plates. If desired, the shaft and tube may be formed integrally, or of a single piece of metal; but the use of the tube is preferred, as this is the most convenient way of thickening the shaft diametrically, especially in repairing or replacing old machines.

Having thus described my invention, what I claim as new, and desire to secure by Letters Patent, is—

1. A shredder for corn-husking machines, consisting in the combination of a central supporting-shaft located in bearings and diametrically thickened between the same, said thickened portion being provided with a key-channel and having right and left screw-threads at its respective ends, circular plates keyed upon said shaft and provided with shredding-teeth and screw-threaded clamping-plates provided with shredding-teeth and adapted to be turned on the screw-threads in the opposite direction to that of the rotation of the shaft, whereby the resistance of the material will tend to bind the plates more rigidly together, substantially as described.

2. A shredder for corn-husking machines consisting in the combination of a central supporting-shaft, a tube located rigidly thereon, and provided with right and left screw-threads at its respective ends, circular plates keyed to said tube and provided with shredding-teeth, and screw-threaded clamping-plates provided with shredding-teeth and adapted to be turned on the ends of said tube in the opposite direction to that of the rotation of the shaft, substantially as described.

3. A shredder for corn-husking machines, consisting in the combination of a shaft supported in bearings and thickened between the same, said thickened portion being provided with a straight longitudinal key-channel and having its respective ends provided with right and left screw-threads, a series of toothed plates provided with openings in which the thickened portion of said shaft is adapted to fit, and having key-notches adapted to register with the key-channel in said shaft, the key-notches in each succeeding plate in the series being located slightly in advance of its adjoining preceding plate, whereby the teeth are caused to assume a spiral arrangement upon the shaft, a key adapted by its engagement in said key channel and notches to lock the plates to the shaft, and end clamping-plates provided with shredding-teeth and adapted to be screwed upon said shaft in the opposite direction to that of its rotation, whereby the resistance of the material tends to bind said plates more firmly together, substantially as described.

In testimony whereof I affix my signature in the presence of two witnesses.

WILLIAM GUTENKUNST.

Witnesses:
JAS. B. ERWIN,
LEVERE H. C. WHEELER.